(12) United States Patent
Wu et al.

(10) Patent No.: US 6,455,339 B1
(45) Date of Patent: Sep. 24, 2002

(54) METHOD FOR FABRICATING PROTRUSION OF LIQUID CRYSTAL DISPLAY

(75) Inventors: Long-Hai Wu, Taoyuan Shien (TW); Sakae Tanaka, Taoyuan Shien (TW)

(73) Assignee: Hannstar Display Corp., Taipei (TW)

(*) Notice: Subject to any disclaimer, the term of this patent is extended or adjusted under 35 U.S.C. 154(b) by 0 days.

(21) Appl. No.: 09/917,044

(22) Filed: Jul. 27, 2001

(30) Foreign Application Priority Data

Nov. 30, 2000 (TW) .......................................... 089125520

(51) Int. Cl.[7] .............................................. H01L 21/00
(52) U.S. Cl. .............................. 438/30; 438/29; 438/22
(58) Field of Search .............................. 438/30, 29, 22; 349/43, 130

(56) References Cited

U.S. PATENT DOCUMENTS

| | | | |
|---|---|---|---|
| 5,637,958 A | * | 6/1997 | Levine |
| 5,888,839 A | * | 3/1999 | Ino et al. |
| 6,348,995 B1 | * | 2/2002 | Hansen et al. |
| 2002/0031852 A1 | * | 3/2002 | Chen |
| 2002/0063811 A1 | * | 5/2002 | Ahn et al. |
| 2002/0063832 A1 | * | 5/2002 | Wu et al. |
| 2002/0063834 A1 | * | 5/2002 | Sawasaki et al. |

FOREIGN PATENT DOCUMENTS

| | | | |
|---|---|---|---|
| JP | 2001051269 | * | 2/2002 |
| JP | 02001133786 | * | 5/2002 |

* cited by examiner

*Primary Examiner*—Long Pham
(74) *Attorney, Agent, or Firm*—Volpe and Koenig, P.C.

(57) ABSTRACT

A method for fabricating a protrusion of a liquid crystal display is disclosed. The method includes steps of providing a substrate pervious to light and having a first thickness, forming a photoresist layer having a second thickness on a first surface of the substrate, providing a photomask over a second surface of the substrate, performing a first exposure with a first exposing light on the photoresist layer with the photomask serving as a mask, wherein a first incident angle of the first exposing light is greater than zero degree, performing a second exposure with a second exposing light on the photoresist layer with the photomask serving as a mask, wherein a second incident angle of the second exposing light is greater than zero degree, and performing a development on the photoresist layer to remove the photoresist layer and form the protrusion on the first surface of the substrate.

21 Claims, 3 Drawing Sheets

METHOD FOR FABRICATING PROTRUSION OF LIQUID CRYSTAL DISPLAY

FIELD OF THE INVENTION

The present invention relates to a method for fabricating a protrusion, and more particularly to a method for fabricating a protrusion of a liquid crystal display.

BACKGROUND OF THE INVENTION

The current trend is towards liquid crystal displays for achieving a larger panel size and a higher resolution. However, the characteristics of response time and wide-viewing angles of a liquid crystal display are still needed to be improved.

In order to improve the response time and the wide-viewing angles, a multi-domain vertically aligned (MVA) liquid crystal display is developed as shown in FIGS. 1(a) and (b). Liquid crystal molecules 13 around protrusions 12 which are formed on an upper substrate 10 and a lower substrate 11 are aligned with an advance inclination as shown in FIG. 1(a) by the protrusions 12. Therefore, when the liquid crystal molecules 13 are applied with an electric field, the liquid crystal molecules 13 are in the inclination state so that the response time and the wide-viewing angle are improved.

Please refer to FIGS. 2(a) and (b) showing protrusions 23 formed on a substrate 20. A positive photoresist layer 21 is coated on a substrate 20, i.e. a glass substrate, and then the positive photoresist layer 21 is exposed through a mask 22 as shown in FIG. 2(b). Subsequently, the exposed portion of the positive photoresist layer 21 is removed by development, and the remaining photoresist structure is formed as protrusions 23 as shown in FIG. 2(b).

However, the side walls of the protrusions 23 formed by the conventional fabricating processes could not be controlled to have the inclination in a triangular shape as shown in FIG. 1. Moreover, the protrusions formed by the conventional fabricating processes would cause the discontinuous alignment and the disclination lines of the liquid crystal molecules.

The present invention provides a method for fabricating a protrusion to overcome the foresaid drawbacks.

SUMMARY OF THE INVENTION

It is an object of the present invention to provide a method for fabricating a protrusion in a fabricating process of a liquid crystal display.

In accordance with the present invention, the method includes steps of providing a substrate pervious to light and having a first thickness, forming a photoresist layer having a second thickness on a first surface of the substrate, providing a photomask over a second surface of the substrate, performing a first exposure with a first exposing light on the photoresist layer with the photomask serving as a mask, wherein a first incident angle of the first exposing light is greater than zero degree, performing a second exposure with a second exposing light on the photoresist layer with the photomask serving as a mask, wherein a second incident angle of the second exposing light is greater than zero, and performing a development on the photoresist layer to remove a portion of the photoresist layer and form the protrusion on the first surface of the substrate.

Preferably, the substrate is a glass substrate.

Preferably, the photoresist layer is a positive photoresist layer.

Preferably, a light source of the exposure has parallel light. The light source is a laser beam. The parallel light is an ultraviolet ray.

Preferably, the pattern of the protrusion is controlled by the width of the photomask and the exposed angle.

Preferably, when the first incident angle and the second incident angle are respectively 30 degrees, a masking pattern of the mask has a width greater than at least $2/\sqrt{3}$ times the first thickness.

Preferably, the substrate is an array substrate of the liquid crystal display.

Preferably, the substrate is a color filter substrate of the liquid crystal display.

Preferably, the liquid crystal display is a multi-domain vertically aligned (MVA) liquid crystal display.

It is another object of the present invention to provide a method for forming a patterned photoresist layer, applying in fabrication of a liquid crystal display.

In accordance with the present invention, the method includes steps of providing a substrate pervious to light and having a first thickness, forming a photoresist layer having a second thickness on a first surface of the substrate, providing a photomask over a second surface of the substrate, performing a first exposure with a first exposing light on the photoresist layer with the photomask serving as a mask, wherein a first incident angle of the first exposing light is greater than zero degree, performing a second exposure with a second exposing light on the photoresist layer with the photomask serving as a mask, wherein the second exposing light has a second incident angle, and performing a development on the photoresist layer to remove a portion of the photoresist layer and form the patterned photoresist layer on the first surface of the substrate.

Preferably, the substrate is a glass substrate.

Preferably, the photoresist layer is a positive photoresist layer. The light source of the exposure has parallel light.

Preferably, the light source is a laser beam. The parallel light is an ultraviolet ray.

Preferably, the first incident angle and the second incident angle are respectively 30 degrees, a masking pattern of said mask has a width greater than at least $2/\sqrt{3}$ times said first thickness.

Preferably, the substrate is an upper and/or substrate of the liquid crystal display.

Preferably, the second incident angle is greater than zero degree.

In addition, the liquid crystal display is a multi-domain vertically aligned (MVA) liquid crystal display.

The present invention may best be understood through the following descriptions with reference to the accompanying drawings, in which:

DETAILED DESCRIPTION OF THE PREFERRED EMBODIMENTS

Figure 1A:
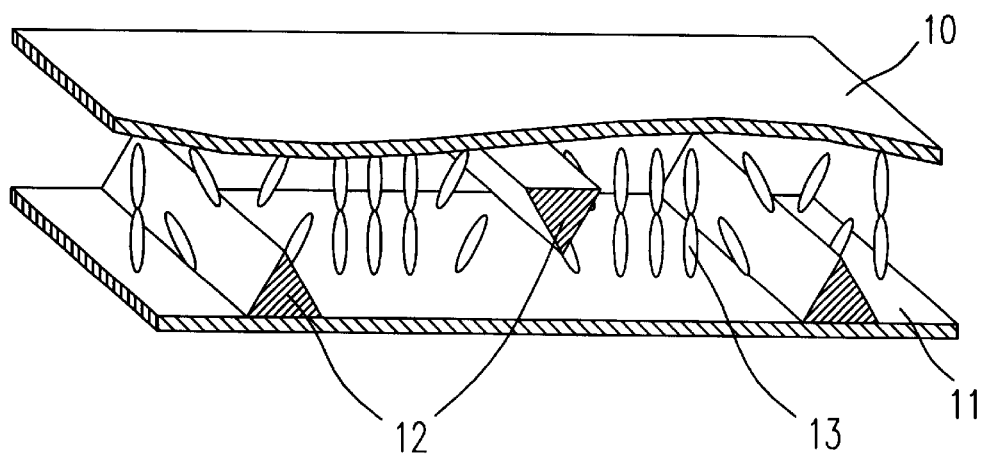
FIGS. 1(a) and (b) are schematic views showing the structure of a multi-domain vertically aligned liquid crystal display according to the prior art.
Figure 1B:
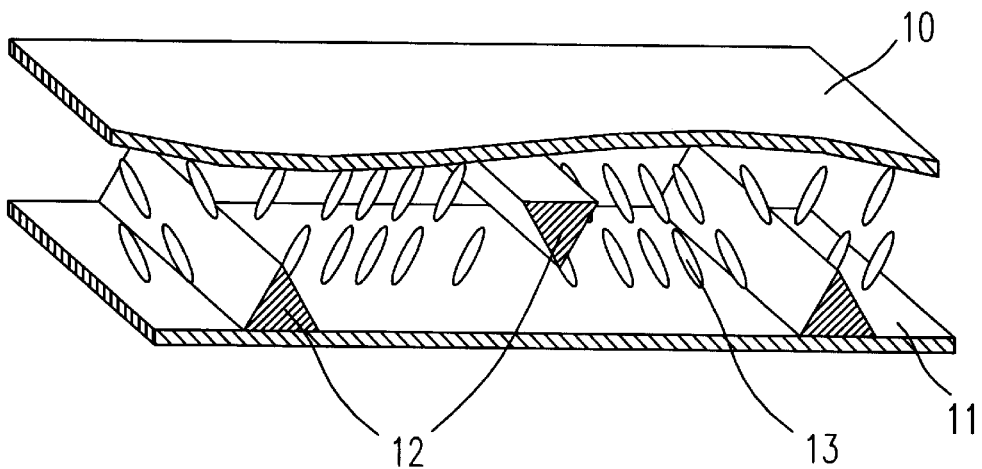
Figure 2A:
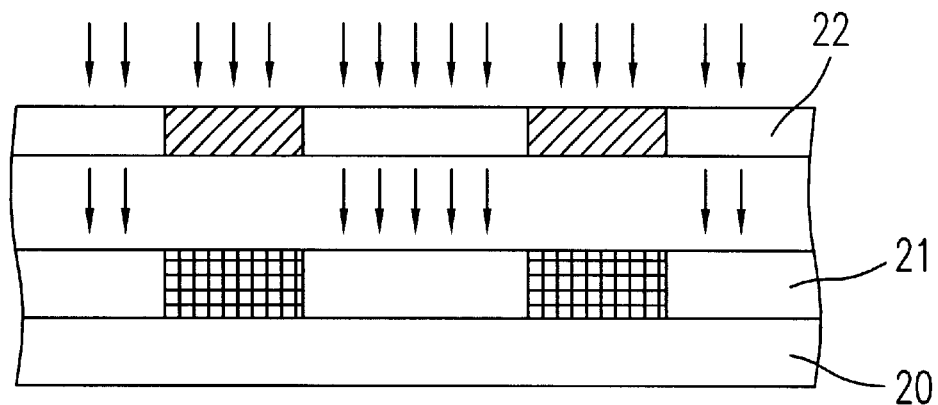
FIGS. 2(a) and (b) are schematic views showing the conventional fabricating process of protrusions formed on a substrate.
Figure 2B:
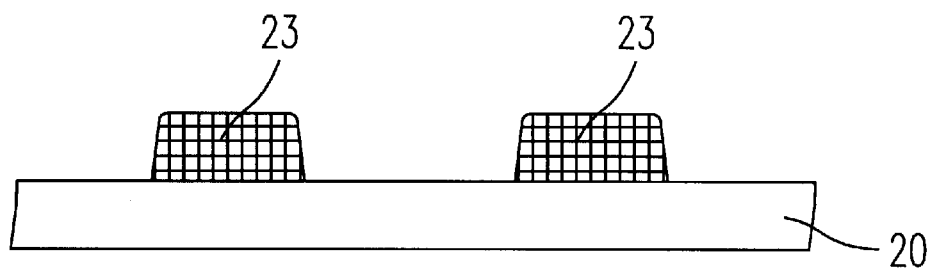
Figure 3A:
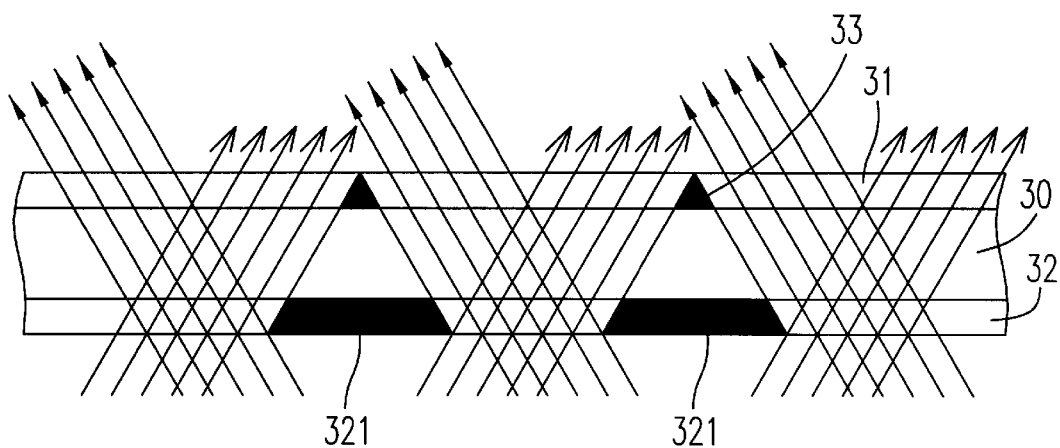
FIGS. 3(a) and (b) are schematic views showing the fabricating process of protrusions formed on a substrate according to the preferred embodiment of the present invention.

FIGS. 3(a) and (b) are schematic views showing the fabricating process of protrusions 33 formed on a substrate 30. A positive photoresist layer 31 having a second thickness is coated on a first surface of the substrate 30, i.e. a glass substrate, pervious to light and having a first thickness. Then, a mask 32 is provided on a second surface of the substrate 30. The positive photoresist layer 31 are back exposed twice as shown in FIG. 3(a). In first exposure, the incident angle of the exposing light is greater than zero degree. In second exposure, the incident angle of the exposing light is greater than zero degree.

Figure 3B:
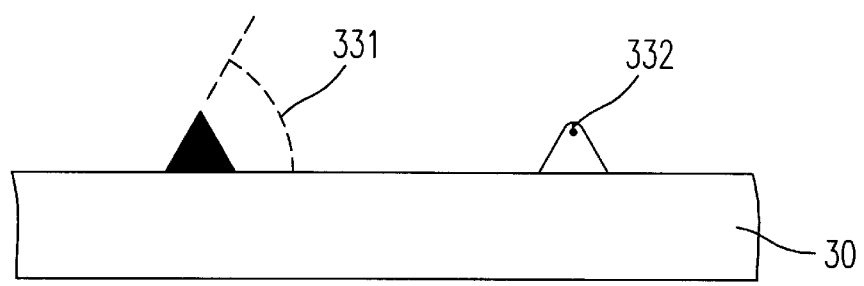

Subsequently, the exposed portion of the positive photoresist layer 31 is removed by development, so that the remaining photoresist structure is formed as shown in FIG. 3(b). The protrusions 33 have a cross-section as a triangular form.

The light source of the foresaid exposure is preferably parallel light, i.e. a laser beam, and the parallel light is preferably ultraviolet rays.

Please refer to FIG. 3(b). The inclination 331 and the circle radius 332 of the protrusions 33 could be controlled by regulating the width of the masking pattern 321 of the mask 32 and the angle of the exposure. When the first incident angle and the second incident angle are respectively 30° and −30°, the width of the masking pattern should be at least greater than $2/\sqrt{3}$ times the first thickness, and the first thickness should be smaller than or equal to the second thickness.

The protrusions provided by the present invention could be formed on the upper and lower substrates of a multi-domain vertically aligned liquid crystal display.

The protrusions provided by the present invention have the advantages that the discontinuous alignment and the disclination lines of the liquid crystal molecules are both overcome. Furthermore, the response time and wide-viewing angles of a liquid crystal display are improved.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A method for fabricating a protrusion in a fabricating process of a liquid crystal display, comprising steps of:
   providing a substrate being pervious to light and having a first thickness;
   forming a photoresist layer having a second thickness on a first surface of said substrate;
   providing a photomask over a second surface of said substrate;
   performing a first exposure with a first exposing light on said photoresist layer with said photomask serving as a mask, wherein a first incident angle of said first exposing light is greater than zero degree;
   performing a second exposure with a second exposing light on said photoresist layer with said photomask serving as a mask, wherein a second incident angle of said second exposing light is greater than zero degree; and
   performing a development on said photoresist layer to remove a portion of said photoresist layer and form said protrusion on said first surface of said substrate.

2. The method according to claim 1, wherein said substrate is a glass substrate.

3. The method according to claim 1, wherein said photoresist layer is a positive photoresist layer.

4. The method according to claim 1, wherein a light source of said exposure has parallel light.

5. The method according to claim 4, wherein said light source is a laser beam.

6. The method according to claim 4, wherein said parallel light is an ultraviolet ray.

7. The method according to claim 1, wherein when said protrusion has a pattern which is controlled by a width of said photomask and an exposed angle.

8. The method according to claim 1, wherein when said incident angle and said incident angle are 30° and 30° respectively, a masking pattern of said mask has a width greater than at least $2/\sqrt{3}$ times said first thickness.

9. The method according to claim 1, wherein said substrate is an array substrate of said liquid crystal display.

10. The method according to claim 1, wherein said substrate is a color filter substrate of said liquid crystal display.

11. The method according to claim 1, wherein said liquid crystal display is a multi-domain vertically aligned (MVA) liquid crystal display.

12. A method for forming a patterned photoresist layer, applying in fabrication of a liquid crystal display, comprising steps of:
   providing a substrate pervious to light and having a first thickness;
   forming a photoresist layer having a second thickness on a first surface of said substrate;
   providing a photomask over a second surface of said substrate;
   performing a first exposure with a first exposing light on said photoresist layer with said photomask serving as a mask, wherein a first incident angle of said first exposing light is greater than zero degree;
   performing a second exposure with a second exposing light on said photoresist layer with said photomask serving as a mask, wherein a second incident angle of said second exposing light is greater than zero degree; and
   performing a development on said photoresist layer to remove a portion of said photoresist layer and form said patterned photoresist layer on said first surface of said substrate.

13. The method according to claim 12, wherein said substrate is a glass substrate.

14. The method according to claim 12, wherein said photoresist layer is a positive photoresist layer.

15. The method according to claim 12, wherein a light source of said exposure has parallel light.

16. The method according to claim 15, wherein said light source is a laser beam.

17. The method according to claim 15, wherein said parallel light is an ultraviolet ray.

18. The method according to claim 12, wherein when said first incident angle and said second incident angle are respectively 30 degrees, a masking pattern of said mask has a width greater than at least $2/\sqrt{3}$ times said first thickness.

19. The method according to claim 12, wherein said substrate is an array substrate of said liquid crystal display.

20. The method according to claim 12, wherein said substrate is a color filter substrate of said liquid crystal display.

21. The method according to claim 12, wherein said liquid crystal display is a multi-domain vertically aligned (MVA) liquid crystal display.

* * * * *